United States Patent
Kohler (10) Patent No.: US 8,635,246 B1
(45) Date of Patent: Jan. 21, 2014

(54) METHOD TO ENABLE CONTINUOUS AVAILABILITY OF DATABASE APPLICATIONS DURING SYSTEM UPGRADE

(75) Inventor: Bernd Kohler, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/589,038

(22) Filed: Aug. 17, 2012

(51) Int. Cl.
*G06F 17/30* (2006.01)

(52) U.S. Cl.
USPC .......................................... 707/781

(58) Field of Classification Search
USPC ............ 707/2, 3, 781; 709/204–206; 455/423
See application file for complete search history.

(56) References Cited

U.S. PATENT DOCUMENTS

2003/0092438 A1* 5/2003 Moore et al. ............. 455/423

* cited by examiner

*Primary Examiner* — Etienne Leroux
(74) *Attorney, Agent, or Firm* — Mintz Levin Cohn Ferris Glovsky and Popeo, P.C.

(57) ABSTRACT

Methods, systems and articles of manufacture are disclosed for upgrading a system while keeping applications continuously available. The upgrade of such a system which consists of several database applications requires an outage for the complete system due to the fact that database objects (e.g. tables, indexes or views) are structurally adjusted or the content of database tables is changed. To overcome this limitation there is provided a method. The method comprises in setting up a temporary failover framework in the same database to allow end-user read and write access to database tables which are not changed during the upgrade outage. The database applications based on these tables are thus made continuously available.

14 Claims, 15 Drawing Sheets

METHOD TO ENABLE CONTINUOUS AVAILABILITY OF DATABASE APPLICATIONS DURING SYSTEM UPGRADE

TECHNICAL FIELD

The subject matter described herein relates to database systems, and more particularly to enabling continuous availability of database applications during system upgrades.

BACKGROUND

Many software applications use databases to store data. The data stored includes application data and configuration data. In addition, some software applications also keep repository data in the database, for instance program code, compiled execution code or meta-data that describes the database layout. The SAP NetWeaver System® and the applications based on it are such an arrangement of various software applications.

Occasionally, a database system needs to be upgraded to apply enhancements, patches and other adjustments. In many cases, these updates imply structural changes of database objects or modifications of the database content. These adjustments generally require a downtime for the complete system of database applications. During the outage no productive operation is possible.

Figure 1:
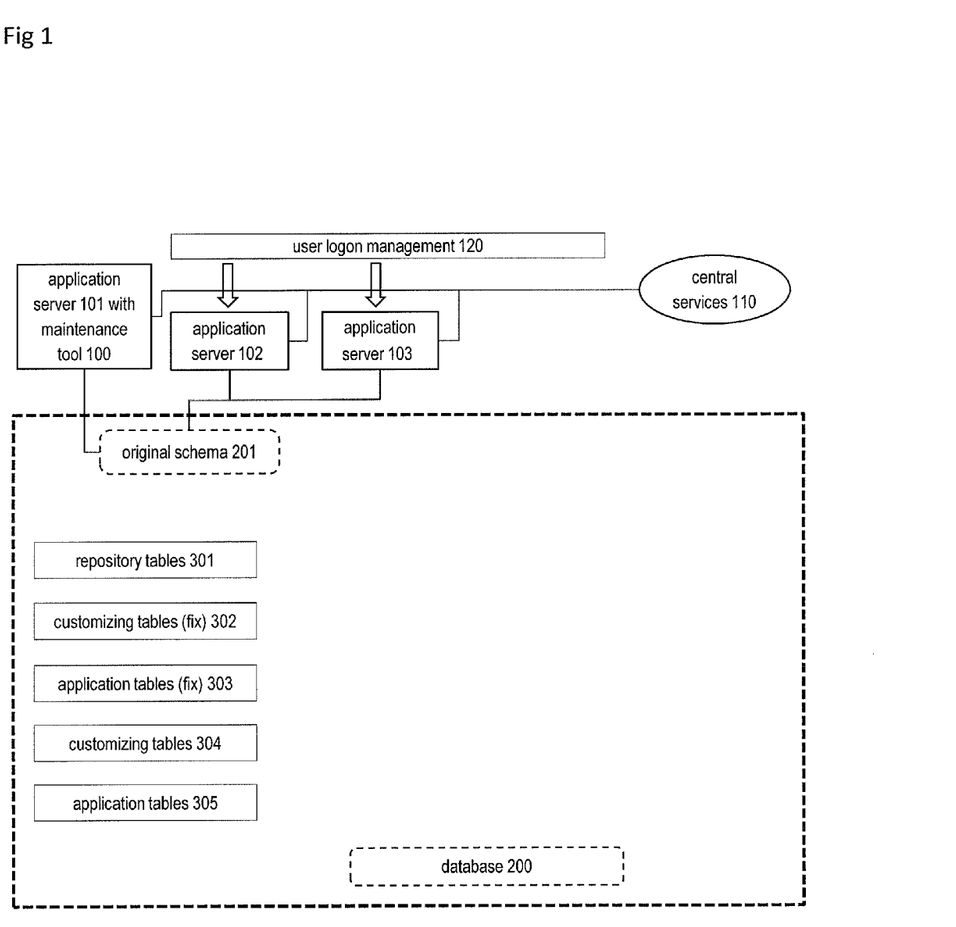
FIG. 1 illustrates a database application system before a system upgrade outage.

FIG. 1 depicts a database application system 10 before an upgrade outage begins. Several application servers 101, 102 and 103 are connected to a database 200. It should be readily apparent to those of skill in the art that the database application system 10 can include any number of application servers. In the example shown in FIG. 1, application server 101 is not accessible to an end-user; it is accessed by a maintenance tool 100. Application servers 102 and 103 serve the work load that is directed to them by a user logon management 120. In some implementations, application servers 102 and 103 can also be connected to an application server which hosts central services 110. For example, within an SAP NetWeaver® system, these central services 110 consists of an enqueue server that handles the locking of SAP business objects and the message server. All application servers 101, 102 and 103 are connected to an original schema 201 within database 200.

Database 200 contains a variety of tables:

Repository tables 301 contain data that is needed to run the database applications. For example, within an SAP system, repository tables 301 contain, among other data, application program source code, execution code of application programs, and the meta-definitions of application objects and database objects.

Customizing tables (fix) 302 are tables that contain customizing data and are not changed during the upgrade outage.

Customizing tables 304 are all other customizing tables which are to be changed during the upgrade outage.

Application tables (fix) 302 are tables which contain application data and are not changed during the database outage.

Application tables 305 are all other tables which contain application data and are to be changed during the upgrade outage.

Figure 2A:
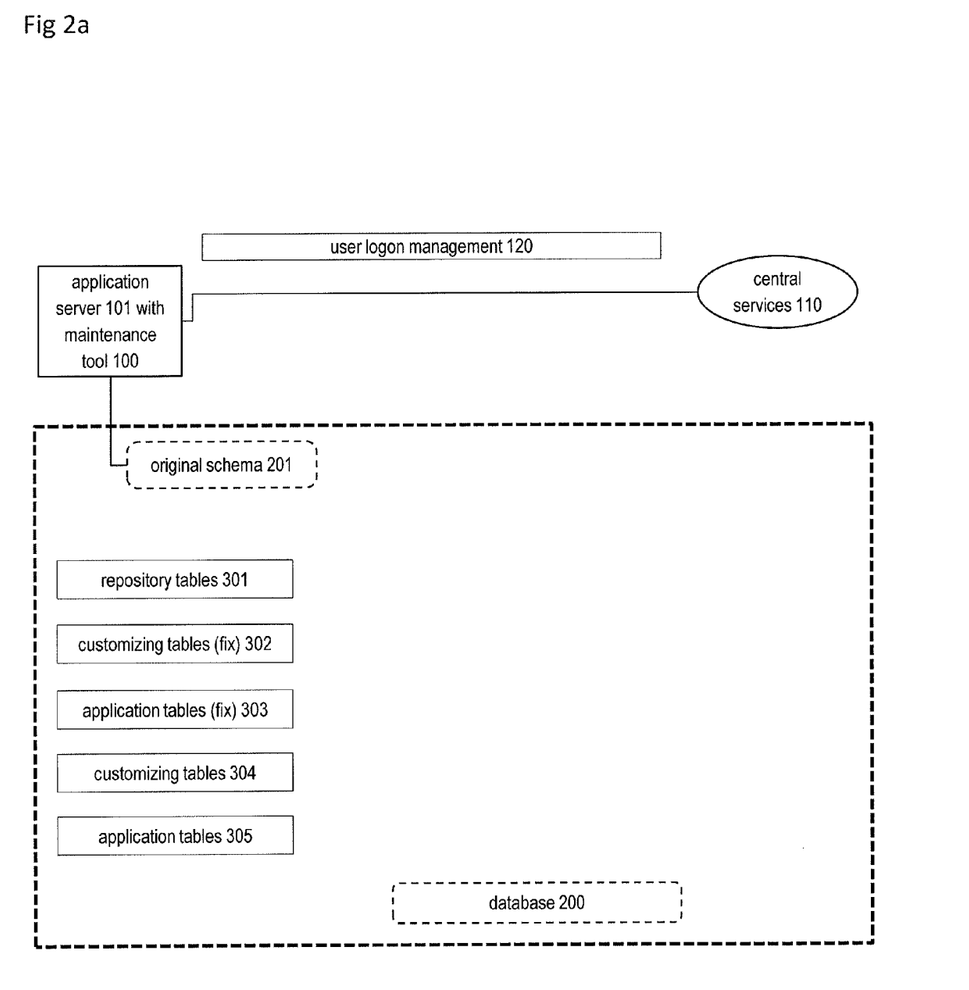
FIGS. 2A-2C illustrate a convention upgrade procedure for a database application system.
Figure 2B:
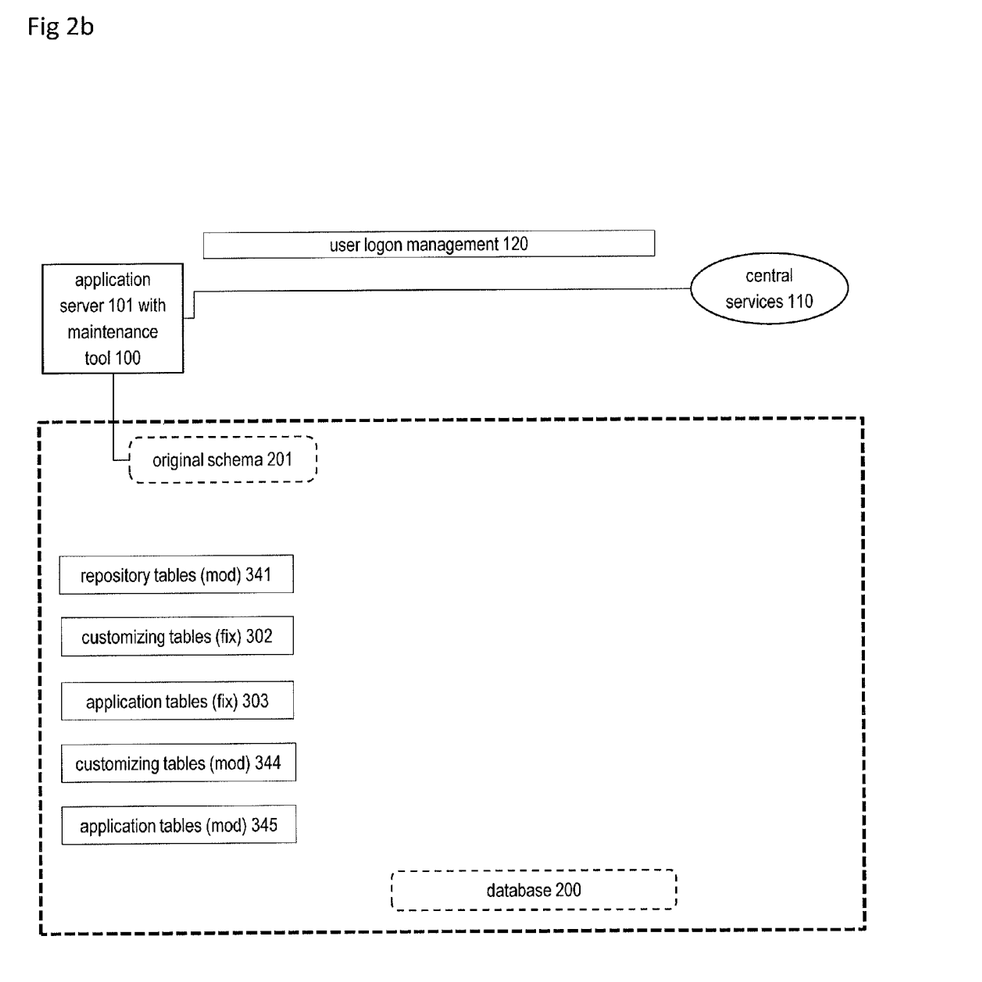
Figure 2C:
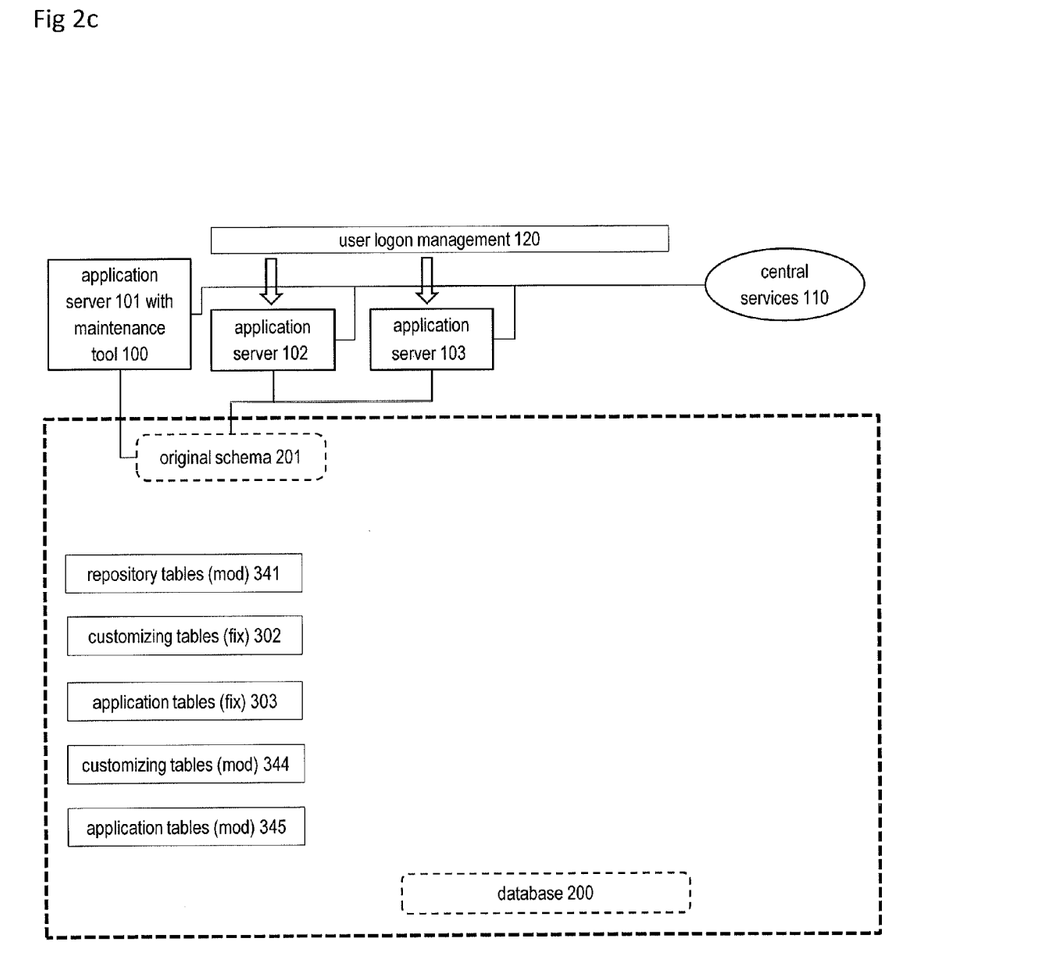

It is possible to add additional application servers to the database application system 10 to manage a higher workload. Conventional database upgrade procedures require an upgrade outage, and a stop of the productive operation. These upgrade procedures work as follows:

As shown in FIG. 2A, all end-users are stopped from connecting to the application servers 102 and 103, and the application servers 102 and 103 are shut down. Productive operations on the system stop. Then, as shown in FIG. 2B, the maintenance tool 100 performs, among other activities, an adjustment of customizing and application tables 302 and 303. The structure and content changes result in modified tables labeled repository tables (mod) 341, customizing tables (mod) 344 and application tables (mod) 345. Finally, as shown in FIG. 2C, application servers 102 and 103 are restarted. Productive operation is re-enabled. User logon management 120 starts to allow end-users to connect to application server 102 and 103 again and continue with productive operation.

For a majority of application users, the outage is acceptable if it does not happen during business hours, i.e. takes place on the weekend, for instance. However, in business systems there are usually also a limited number of applications that need to be continuously available. Some examples of these applications include: online banking web interfaces, and banking account services that are needed by automated teller machines (ATMs).

SUMMARY

The subject matter described herein provides methods and apparatus, including computer program products to eliminate the upgrade outage for selected applications during the system upgrade. The methods can include providing a temporary failover framework that includes a copy of repository tables and synonyms to application and customizing tables and database views that are not adjusted during the upgrade outage.

The temporary failover framework allows database users to fully access the database tables and read or modify the content of these tables, which in effect means that they are able to continue productive operation during the upgrade outage. Once, all structural changes and content adjustments are finished for those database objects which are not accessed by the temporary failover framework, it is possible to remove the copy of repository tables and the synonyms from the database and switch back to the original system.

In one aspect, a method, computer program product and non-transitory computer-readable medium having instructions to execute the method are provided. The method includes establishing a failover framework in the database application system, where the failover framework includes a number of database tables that are aliases of unmodified database tables of an original database application framework. The method further includes enabling, via one or more application servers, end-user read and write access to the database tables that are aliases of the unmodified database tables during the system upgrade.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3A-3K illustrate a new upgrade procedure for a database application system in accordance with some preferred implementations, in which:

When practical, similar reference numbers denote similar structures, features, or elements.

DETAILED DESCRIPTION

This document describes methods and apparatus executing such methods, including computer program products, to eliminate an upgrade outage for selected database applications during a system upgrade. The methods can include providing a temporary failover framework that includes a copy of repository tables and synonyms to application and customizing tables and database views that are not adjusted during the upgrade outage.

Figure 3A:
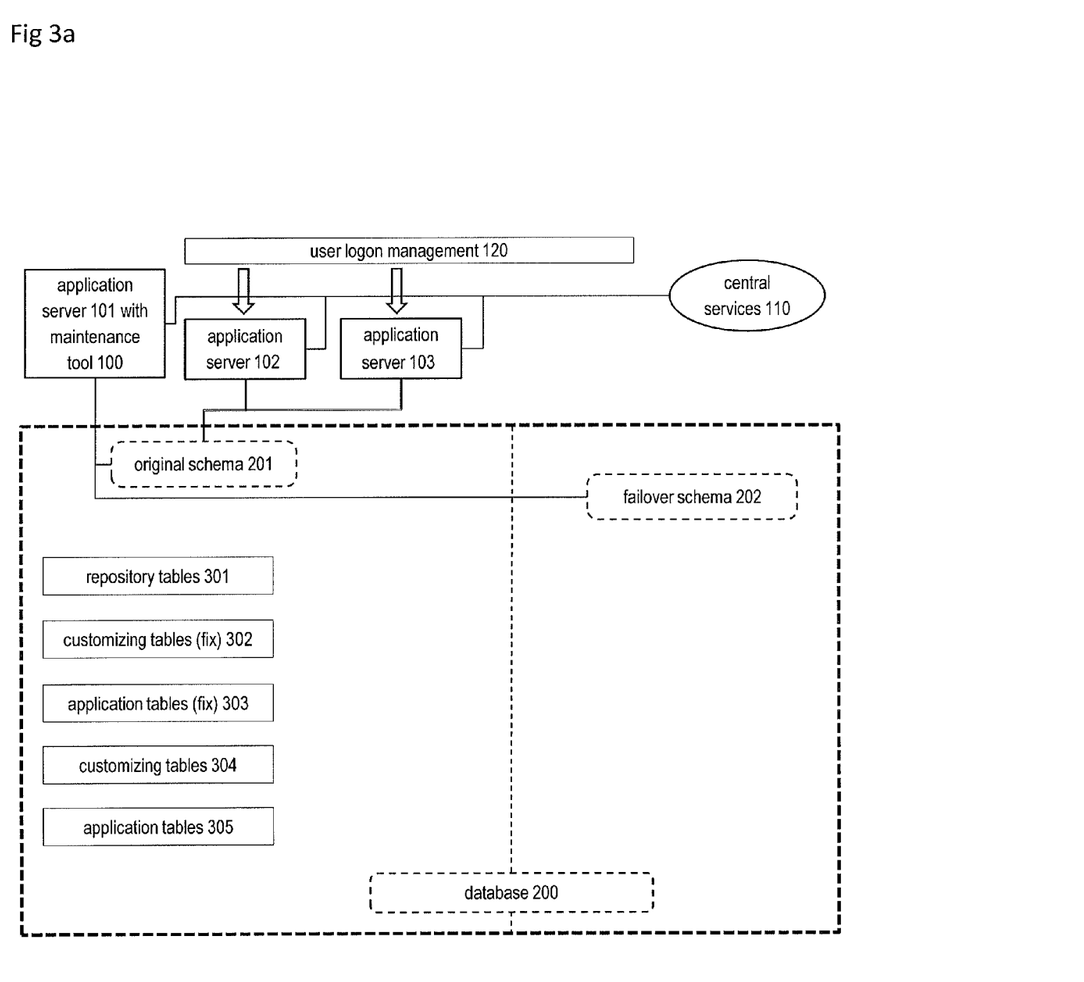
FIG. 3A illustrates creation of a failover schema.
Figure 3B:
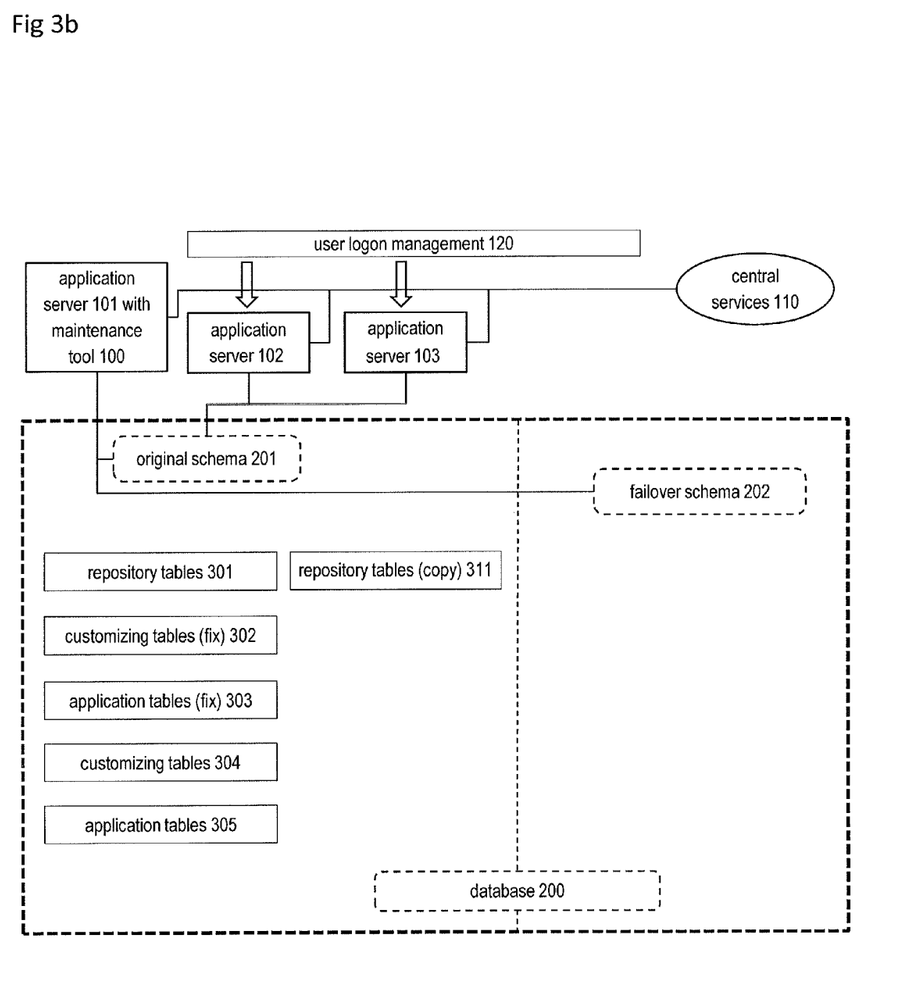
FIG. 3B illustrates copying of repository tables.

FIGS. 3A-3K illustrate methods of a database application system upgrade, which eliminates upgrade outage for selected database applications. As shown in FIG. 3A, maintenance tool 100 generates a failover schema 202 in database 200. Next, as shown in FIG. 3B, the maintenance tool 100 generates a replica of all repository tables 301 within the original database schema 201 which results in a set of tables labeled repository tables (copy) 311. During the copy, it must be ensured that that neither the content nor the structure of repository tables 301 is modified. This is to avoid inconsistencies. Next, as shown in FIG. 3B, the maintenance tool 100 generates a failover schema 202 in database 200.

Figure 3C:
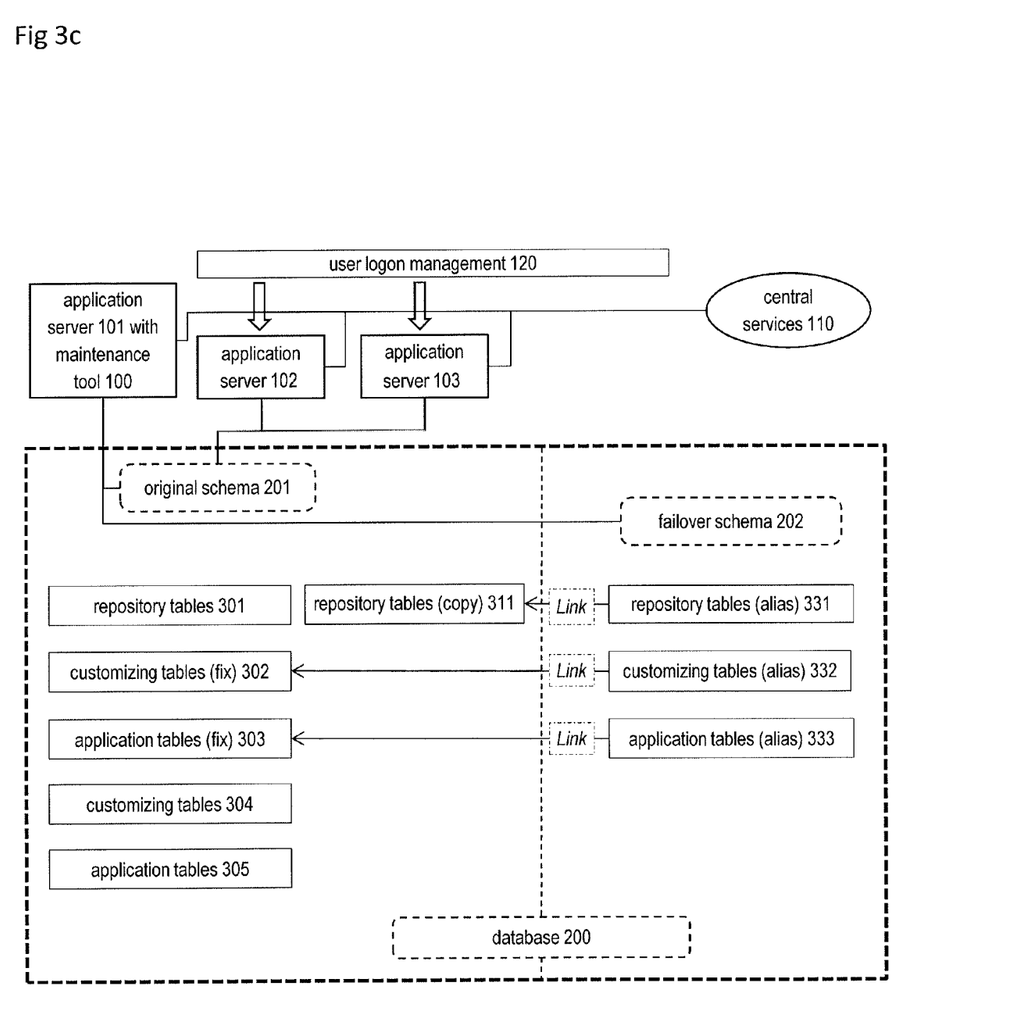
FIG. 3C illustrates setup of a failover framework.

Within the failover schema 202, as shown in FIG. 3C, maintenance tool 100 creates links on the customizing tables (fix) 302, the application tables (fix) 303, and the repository tables (copy) 311. The respective database objects are called views, synonyms or aliases. The new objects are labeled: repository tables (alias) 331, customizing tables (alias) 332 and application tables (alias) 333.

Figure 3D:
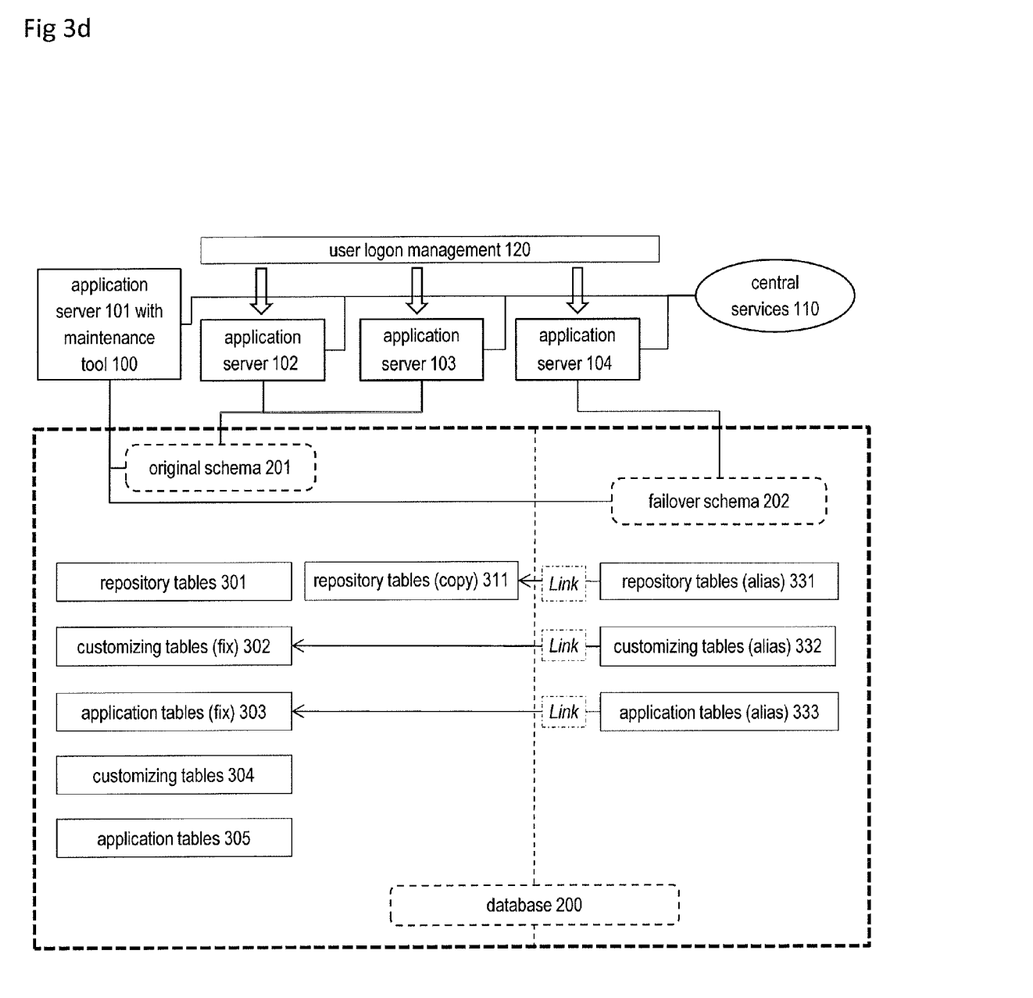
FIG. 3D illustrates start-up of the failover framework.

As shown in FIG. 3D, an additional application server 104 is started and connects to the failover schema 202. The additional application server 104 provides additional workload capacity to enable a restart of the application servers 102 and 103, and which allows them to connect to the failover schema 202. All newly connected end-users are now directed to application server 104 by the user logon management 120.

Figure 3E:
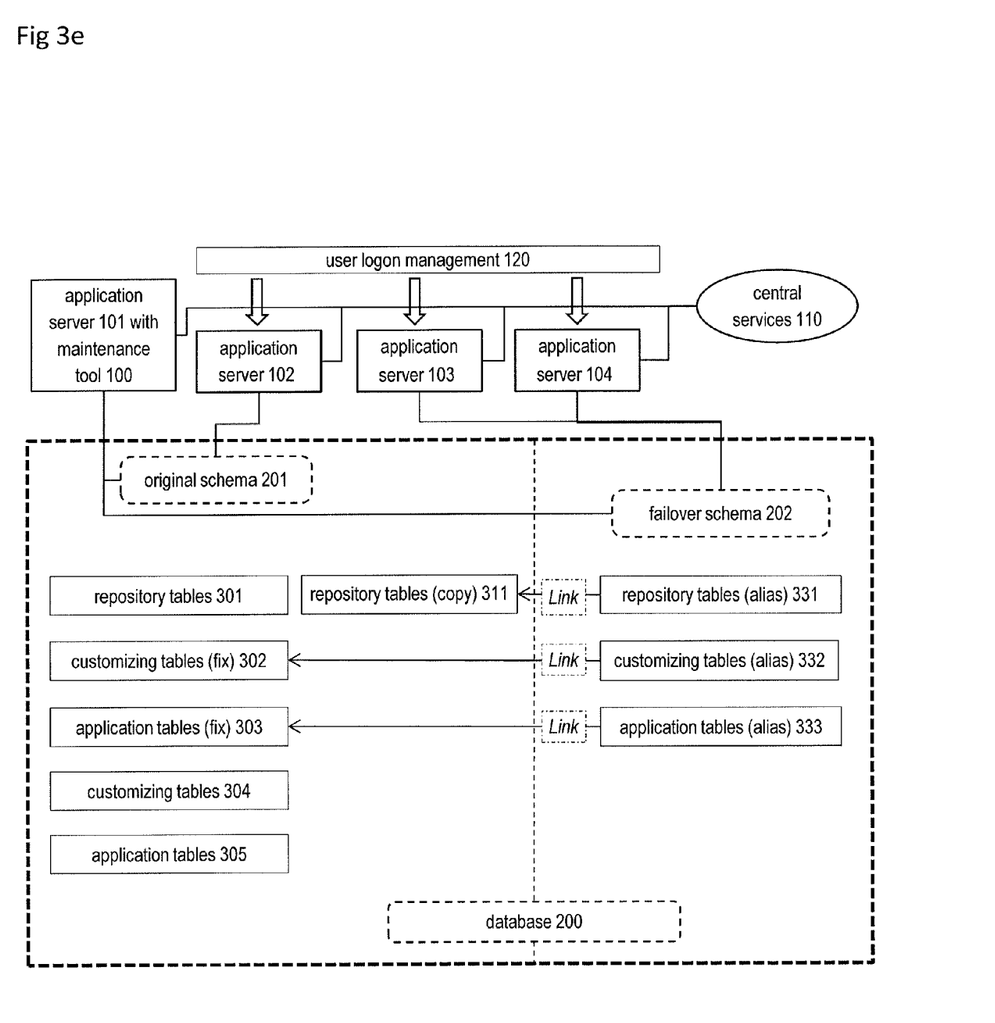
FIG. 3E illustrates a switch of a first application server to the failover framework.
Figure 3F:
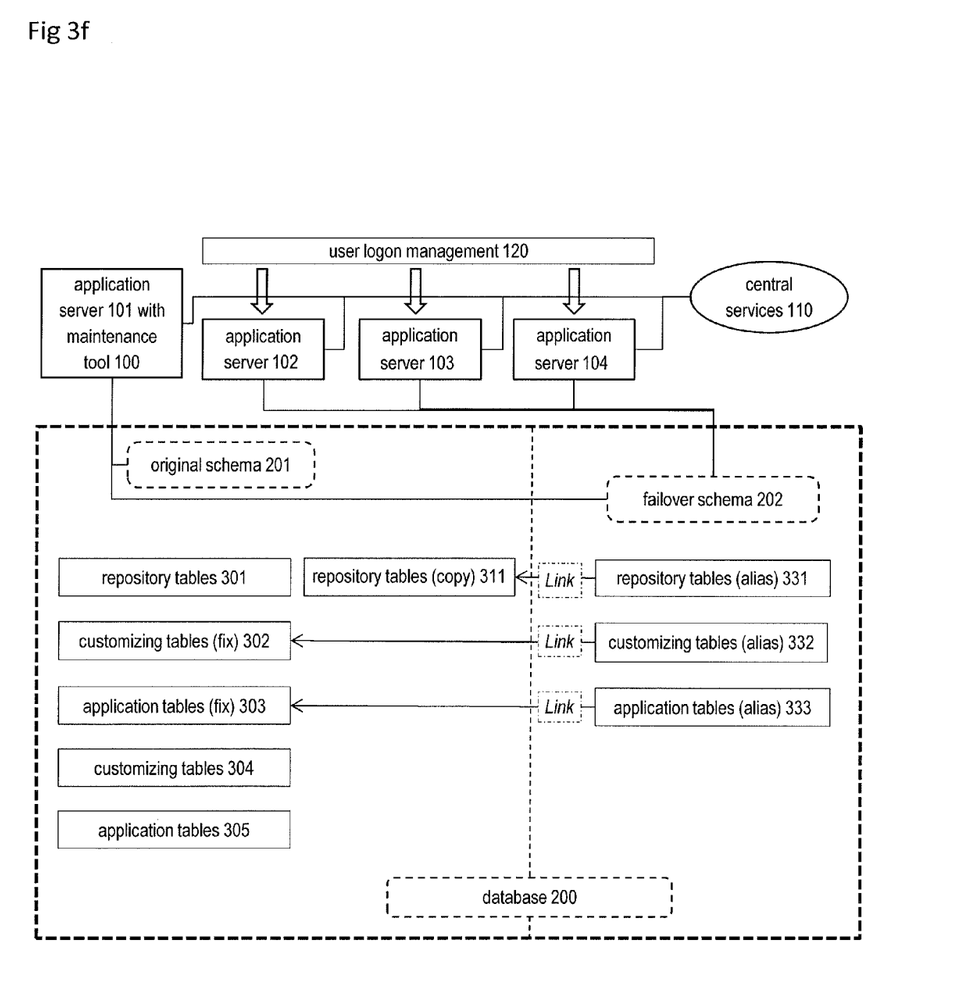
FIG. 3F illustrates a switch of a second application server to the failover framework.

After the last end-user is logged off from application server 103, application server 103 is restarted and—after the restart—connects now to failover schema 202, as shown in FIG. 3E. User logon management 120 restarts to direct end-users to application server 103. Likewise, as shown in FIG. 3F, after the last end-user is logged off from application server 102, application server 102 is restarted and—after the restart—connects to failover schema 202. User logon management 120 restarts to direct end-users to application server 102.

Figure 3G:
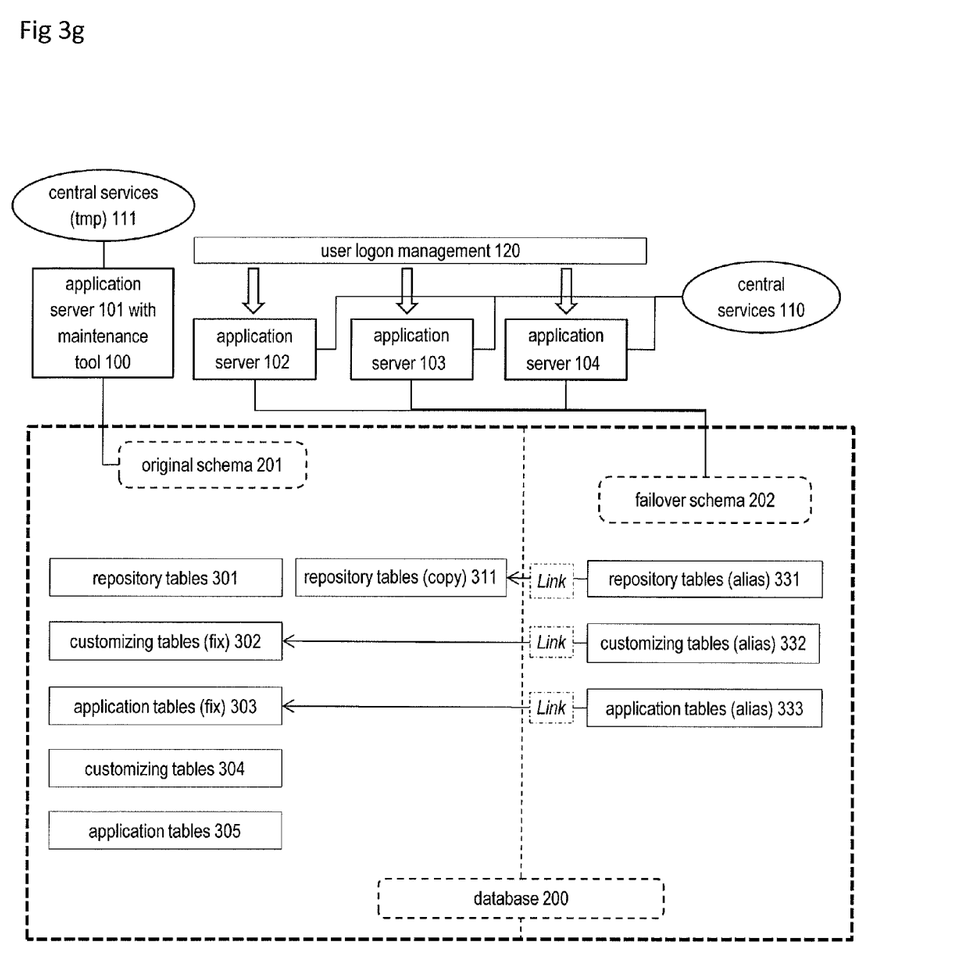
FIG. 3G illustrates decoupling of a third application server and its associated maintenance tool.

As shown in FIG. 3G, an application server which temporarily hosts central services (tmp) 111 for application server 101 is started. Application server 101 is re-started and—after the restart—connects to central services (tmp) 111 and the original schema 201. With that, application server 101 is now completely decoupled from the set of application servers 102, 103 and 104.

Figure 3H:
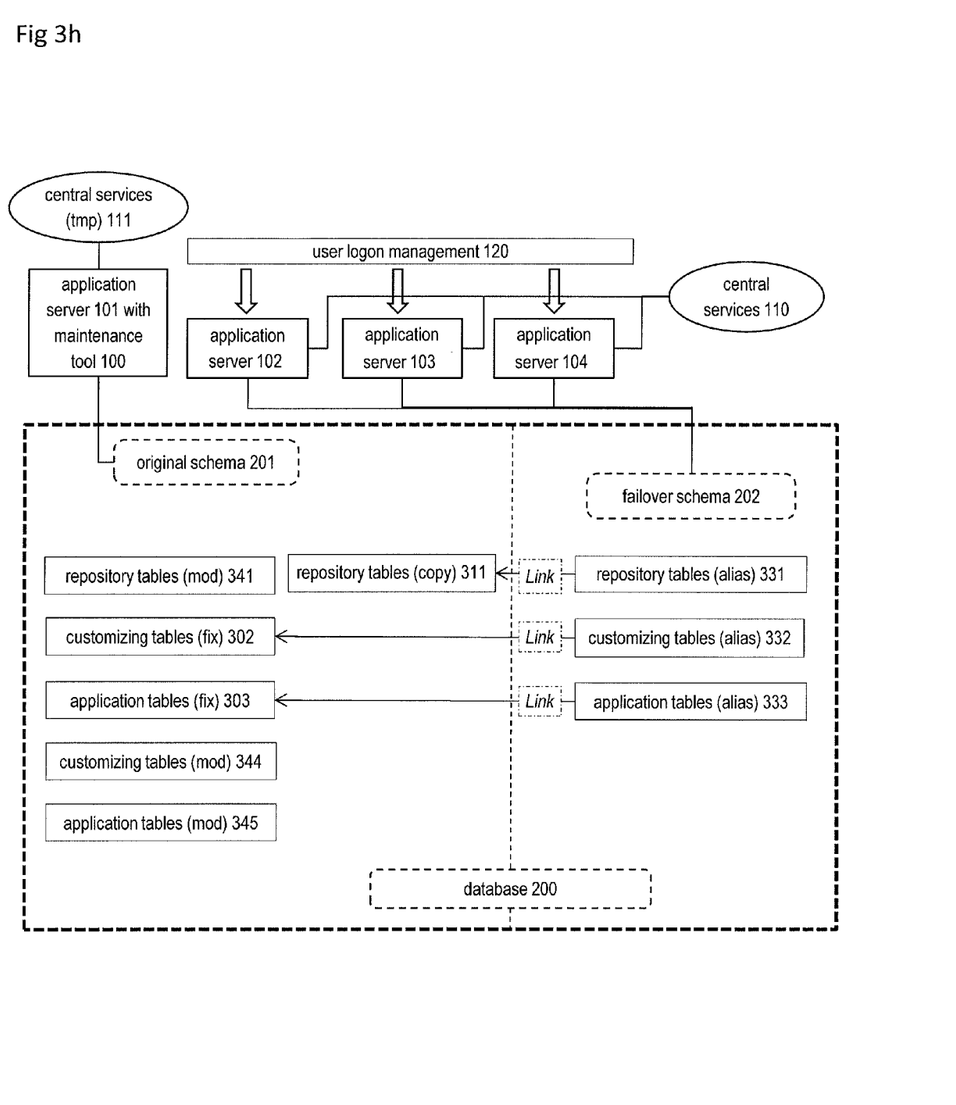
FIG. 3H illustrates modification of repository, application, and customizing tables.

As shown in FIG. 3H, maintenance tool modifies the repository tables 301, customizing tables 304 and application tables 305, either directly or by calling application server 101. These tables are labeled in FIG. 3H as repository tables (mod) 341, customizing tables (mod) 344 and application tables (mod) 345 after their structural or content-wise modification.

Figure 3I:
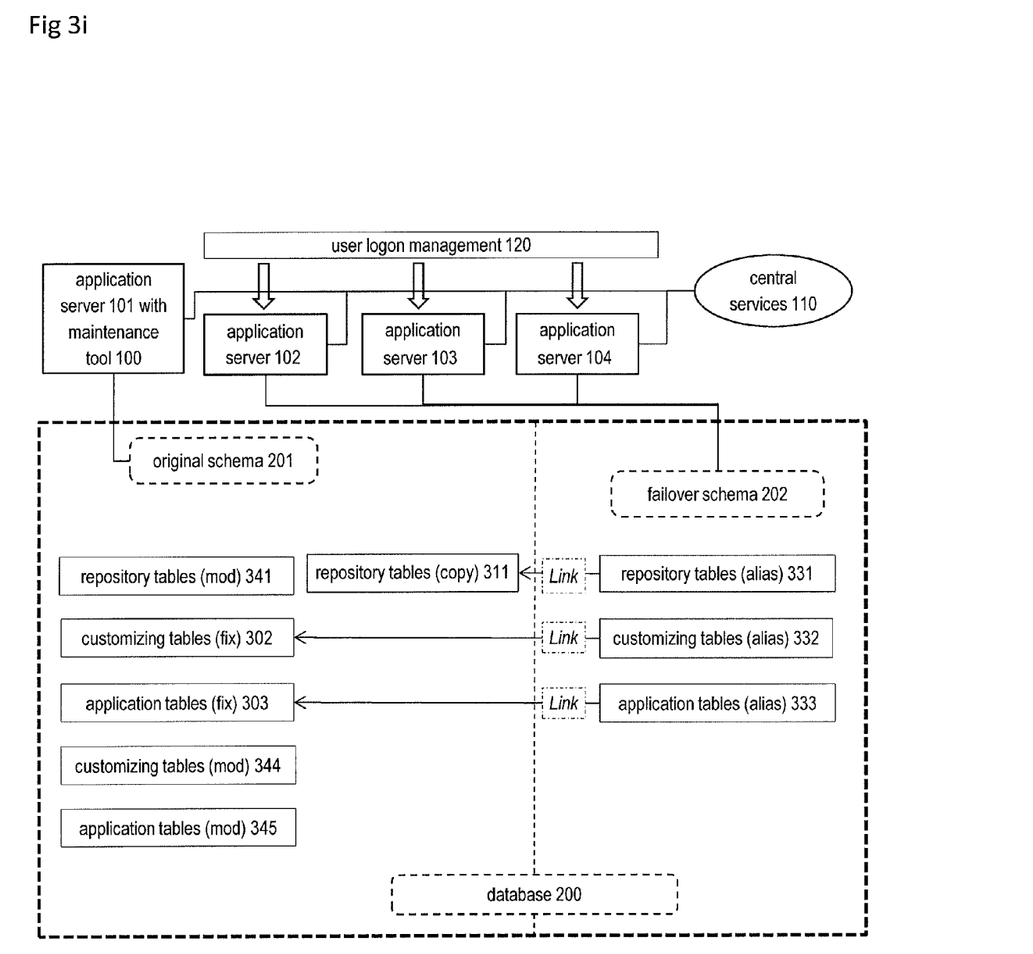
FIG. 3I illustrates re-coupling of the third application server.
Figure 3J:
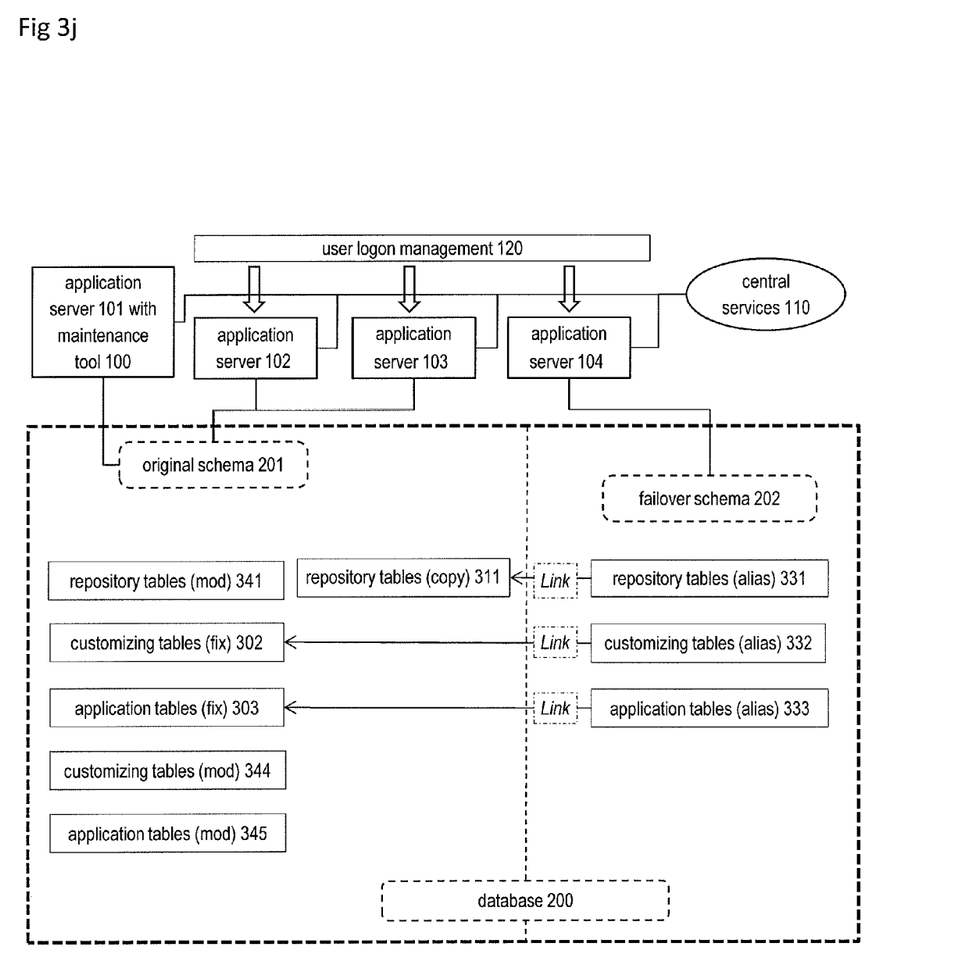
FIG. 3J illustrates a switch back of the first and second application servers to the original schema.
Figure 3K:
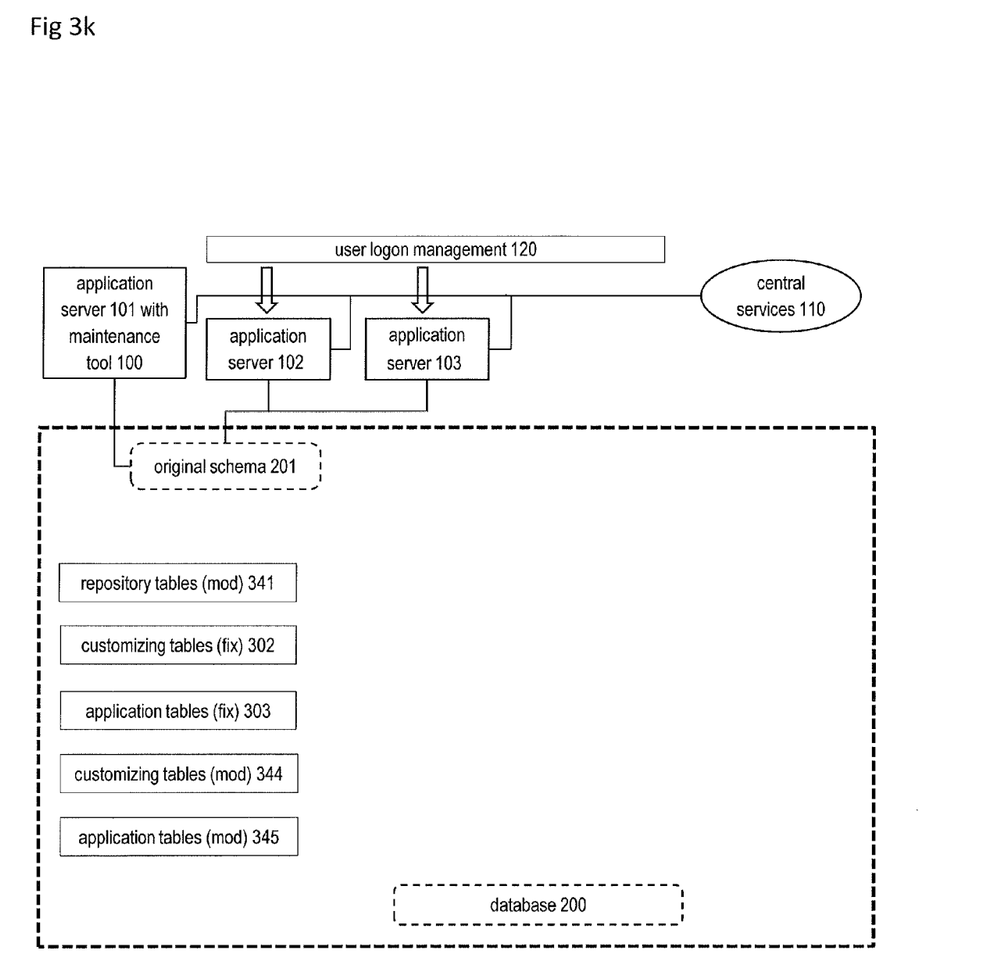
FIG. 3K illustrates shutdown of a fourth application server.

Next, as shown in FIG. 3I, application server 101 is stopped and after the restart connects to central services 110. Then, as shown in FIG. 3J, application servers 102 and 103 switch back to the original schema 201, and application server 104 is shut down. These restarts/stops are performed in a way that end-users are able to finish their transactions. Finally, as shown in FIG. 3K, maintenance tool 100 connects to failover schema 202 and deletes all links and copies, i.e. repository tables (alias) 331, customizing tables (alias) 332, application tables (alias) 333 and repository tables (copy) 311. Subsequently, the failover schema 202 is deleted.

The method described above implies certain rules for the changes of applications that are kept continuously available using the failover system. The database objects accessed by the continuously available applications are not changed structurally during the upgrade and in particular during the runtime of the failover system. Application development needs to ensure that the continuously available application program code is only changed such that all database content changes are compatible to the original version. Further, the central services 110 must be compatible to the old and new software level on application servers 101, 102, 103 and 104.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for a system upgrade of a database application system, the method comprising:
    establishing, by one or more data processors, a failover framework within a database in the database application system, the failover framework comprising of a plurality of database tables that are aliases of unmodified database tables of an original database application framework within the database; and
    enabling, by the one or more data processors and via one or more application servers, end-user read and write access to the database tables that are aliases of the unmodified database tables during the system upgrade.

2. The method as in claim 1, wherein the plurality of database tables includes repository tables that contain data to run database applications of the database application system, customizing tables that contain customizing data for customizing the database applications, and application tables that contain data on which the database applications execute application functions.

3. The method as in claim 2, wherein establishing the failover framework further comprises establishing aliases of the repository tables, the customizing tables, and the application tables to be modified.

4. The method as in claim 3, wherein enabling end-user read and write access further comprises connecting one or more database applications with the aliases of the repository tables, the customizing tables, and the application tables.

5. The method as in claim 4, further comprising generating a copy of the repository tables for linking with the alias of the repository tables.

6. The method as in claim 4, further comprising:
    providing, by one or more data processors, the system upgrade of a database application system to selected original repository tables, the customizing tables, and the application tables; and
    after the system upgrade, reconnecting, by one or more data processors, the one or more database applications with upgraded repository tables, the customizing tables, and the application tables.

7. A non-transitory computer-readable medium containing instructions to configure a processor to perform a method, the method comprising:
    establishing a failover framework within a database in a database application system, the failover framework comprising a plurality of database tables that are aliases of unmodified database tables of an original database application framework within the database; and enabling, via one or more application servers, end-user read and write access to the database tables that are aliases of the unmodified database tables during the system upgrade.

8. The method as in claim 7, wherein the plurality of database tables includes repository tables that contain data to run database applications of the database application system, customizing tables that contain customizing data for customizing the database applications, and application tables that contain data on which the database applications execute application functions.

9. The method as in claim 8, wherein establishing the failover framework further comprises establishing aliases of the repository tables, the customizing tables, and the application tables to be modified.

10. The method as in claim 9, wherein enabling end-user read and write access further comprises connecting one or more database applications with the aliases of the repository tables, the customizing tables, and the application tables.

11. The method as in claim 10, further comprising generating a copy of the repository tables for linking with the alias of the repository tables.

12. The method as in claim 10, further comprising:
providing the system upgrade of a database application system to selected original repository tables, the customizing tables, and the application tables; and
after the system upgrade, reconnecting the one or more database applications with upgraded repository tables, the customizing tables, and the application tables.

13. A system comprising:
a processor; and
a memory, wherein the processor and the memory are configured to perform a method to:
establish a failover framework within a database in a database application system, the failover framework comprising a plurality of database tables that are aliases of unmodified database tables of an original database application framework within the database; and
enable, via one or more application servers, end-user read and write access to the database tables that are aliases of the unmodified database tables during the system upgrade.

14. A computer implemented method for enabling continuous availability of database applications during system upgrade, the method comprising:
creating, using one or more data processors, a failover framework within a database application system having a database, the database comprising one or more of each of repository tables that contain data to run database applications of the database application system, customizing tables that contain customizing data for customizing the database applications, and application tables that contain data on which the database applications execute application functions;
copying, using one or more data processors, the repository tables, the customizing tables, and the application tables to generate aliases of the repository tables, the customizing tables, and the application tables;
starting up, using one or more data processors, the failover framework;
switching, using one or more data processors, one or more first application servers from an original database system schema to the failover framework;
decoupling, using one or more data processors, one or more second application servers from the original database system schema, each of the one or more second application servers having an associated maintenance tool;
modifying, using one or more data processors, selected ones of the repository tables, the customizing tables, and the application tables;
re-coupling, using one or more data processors, the one or more second application servers to the original database system schema having the modified repository tables, the customizing tables, and the application tables;
switching back, using one or more data processors, the one or more first applications to the original database system schema; and
shutting down, using one or more data processors, one or more third application servers that no longer use the modified repository tables, the customizing tables, and the application tables.

* * * * *